United States Patent
Boze (10) Patent No.: US 10,391,448 B2
(45) Date of Patent: Aug. 27, 2019

(54) SELECTIVE CATALYTIC REDUCTION (SCR) CONTROL OPTIMIZATION

(71) Applicant: Florida Power & Light Company, Juno Beach, FL (US)

(72) Inventor: Matthew Gerard Boze, Palm City, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 302 days.

(21) Appl. No.: 15/163,854

(22) Filed: May 25, 2016

(65) Prior Publication Data

US 2017/0341024 A1 Nov. 30, 2017

(51) Int. Cl.
*B01D 53/86* (2006.01)
*B01D 53/90* (2006.01)

(52) U.S. Cl.
CPC ..... *B01D 53/8696* (2013.01); *B01D 53/8625* (2013.01); *B01D 53/90* (2013.01); *B01D 2251/2062* (2013.01); *B01D 2257/404* (2013.01)

(58) Field of Classification Search
None
See application file for complete search history.

(56) References Cited

U.S. PATENT DOCUMENTS

| 2004/0057889 | A1 | 3/2004 | Buzanowski | |
|---|---|---|---|---|
| 2006/0047347 | A1* | 3/2006 | Boyden | G05B 13/048 700/19 |
| 2007/0079624 | A1* | 4/2007 | Max | B01D 53/265 62/285 |
| 2010/0122520 | A1* | 5/2010 | Han | F01N 3/208 60/274 |
| 2012/0096835 | A1 | 4/2012 | Gates et al. | |
| 2012/0226424 | A1* | 9/2012 | Adams | F01N 3/20 701/93 |

* cited by examiner

*Primary Examiner* — Matthew D Krcha
(74) *Attorney, Agent, or Firm* — Tarolli, Sundheim, Covell & Tummino LLP (57) ABSTRACT

A method, controller and computer readable storage medium for dosing ammonia in a selective catalytic reduction (SCR) system for reducing $NO_x$ emissions in a flue gas, are disclosed. The method generally includes calculating a running long term average of $NO_x$ emissions, calculating a running short term average of $NO_x$ emissions and automatically adjusting an instantaneous $NO_x$ setpoint based on the running long term and short term averages to ensure compliance with a permit limit. The ammonia dosing requirement is based on a chemical mass-balance approach, and accuracy is enhanced by adjusting for the $NO_2$ to NO composition of $NO_x$.

17 Claims, 4 Drawing Sheets

SELECTIVE CATALYTIC REDUCTION (SCR) CONTROL OPTIMIZATION

BACKGROUND

The present disclosure relates generally to process control for reducing air pollution emissions, and more particularly, to improving nitrogen oxide removal by optimizing control of a selective catalytic reduction (SCR) process.

SCR is a process that converts nitrogen oxides ($NO_x$) via a catalyst to into diatomic nitrogen ($N_2$) and water ($H_2O$). Typically, ammonia ($NH_3$) or aqueous ammonia $NH_4OH$ is injected and mixed with gases that pass through a catalyst grid to reduce $NO_x$. In a conventional SCR control system, a controller measures inlet $NO_x$, outlet $NO_x$ and ammonia flow in real time. Logic in the controller adjusts the ammonia injection rate via an ammonia control valve to minimize residual $NO_x$ emissions. Typically, real world inefficiencies result in some ammonia slip, which is unreacted $NH_3$ downstream of the SCR catalyst. $NO_x$ removal requirements are dictated by hourly and daily limits. As attempts are made to drive outlet $NO_x$ closer to zero, more ammonia must be injected into the process, resulting in an increase in ammonia slip emissions. The operating objective is to attain the desired level of $NO_x$ reduction while minimizing ammonia slip, since excess ammonia slip from over-control is undesirable and wasteful from a cost perspective.

Ammonia injection control logic continuously monitors heat input, SCR $NO_x$, stack $NO_x$, stack $O_2$ and ammonia flow, determines ammonia control valve action, and mixes the ammonia solution into a slipstream of stack gas for delivery to an ammonia injection grid (AIG). In current implementations, the setpoint is statistically set based upon past analysis to ensure compliance with the current level of performance. Actual emissions are not tracked automatically so any adjustments to setpoints for periods of high emissions are done manually by an operator. The volume of $NO_x$ to be controlled is derived from estimating the volume throughput from Combustion Turbine (CT) Megawatts and ambient temperature. Exhaust flow rate is multiplied by corrected SCR $NO_x$ measurements and adjustment is made for additional $NO_x$ from duct burner firing based on duct burner flow rates. The percent of $NO_x$ removal required is calculated by measuring the difference between the SCR $NO_x$ concentration and the setpoint and dividing the same by the SCR $NO_x$ concentration value. This is adjusted by an additional factor calculated by trimming logic that factors in the compliance $NO_x$ measurement and additional factors to determine if an adjustment is needed to maintain compliance.

Current ammonia dosing logic is reliant upon empirical relationships and assumptions, and therefore is not a true chemical mass balance. The determination of SCFH of ammonia required is calculated by multiplying the estimated volume of $NO_x$ by the percent removal calculation. A conversion factor of 1.35 is used which assumes that all $NO_x$ is $NO_2$, since removal of $NO_2$ requires more ammonia than NO. For the actual ammonia flow measurement, aqueous ammonia is monitored in real time in pounds per hour. The flow is converted to SCFH of ammonia. The controller compares the calculated ammonia requirement to the actual ammonia flow and adjusts the ammonia injection valve as necessary.

SUMMARY

In accordance with an aspect of the disclosure, there is provided a method of dosing ammonia in a selective catalytic reduction (SCR) system for reducing $NO_x$ emissions in a flue gas. The method generally includes calculating a running long term (i.e., daily) average of $NO_x$ emissions, calculating a running short term (i.e., hourly) average of $NO_x$ emissions and adjusting an instantaneous $NO_x$ setpoint based on the running long term and short term averages. A stoichiometric constant is determined based upon a ratio of $NO_2$ to NO in the emissions. Inlet $NO_x$ is compared to the instantaneous setpoint to calculate a primary ammonia dosing need, and outlet $NO_x$ is compared to the instantaneous setpoint to calculate a secondary ammonia dosing need. An ammonia dosing valve is controlled for administering ammonia into the flue gas based upon the combined primary and secondary ammonia dosing need.

In accordance with a further aspect of the disclosure, the method determines whether the running long term average is greater than a defined limit (permit limit or alternatively, a user defined target) and adjusting a short term target if the running long term average is greater than the defined limit. The instantaneous setpoint may be adjusted when the running long term average is greater than the short term target.

In accordance with another aspect of the disclosure, the method includes the step of temporarily adjusting the setpoint based upon a comparison of the running short term average to the instantaneous setpoint, a first time elapsed in a short term period, and a second time remaining in the short term period.

In accordance with yet another aspect of the disclosure, there is provided a controller for dosing ammonia in a selective catalytic reduction (SCR) system for reducing $NO_x$ emissions in a flue gas. The controller includes a processor and memory storing machine readable instructions, which when executed by the processor, cause the processor to calculate a running long term average of $NO_x$ emissions and calculate a running short term average of $NO_x$ emissions. The processor adjusts an instantaneous NOx setpoint based on the running long term and short term averages. A stoichiometric constant is determined based upon a ratio of $NO_2$ to NO in the emissions. The processor compares inlet $NO_x$ to the instantaneous setpoint and calculates a primary ammonia dosing need, and compares outlet $NO_x$ to the setpoint and calculates a secondary ammonia dosing need. The processor controls an ammonia dosing valve to administer ammonia into the flue gas based upon the combined primary and secondary ammonia dosing need.

In accordance with yet another aspect of the disclosure, there is provided a non-transitory computer readable storage medium comprising machine readable instructions stored thereon, which when executed by a processor, cause a controller in a selective catalytic reduction (SCR) system for reducing $NO_x$ emissions in a flue gas to implement the methodology set forth above.

In accordance with these and additional aspects that will become apparent hereinafter, the present disclosure will now be described with particular reference to the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Specific embodiments of the disclosure will now be described in detail with reference to the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more through understanding of the disclosure. However, it will be apparent to those skilled in the art that the disclosure may be practiced without these specific details. In other instances, well-known features have not been described in detail to avoid unnecessarily complicating the description.

Figure 1:
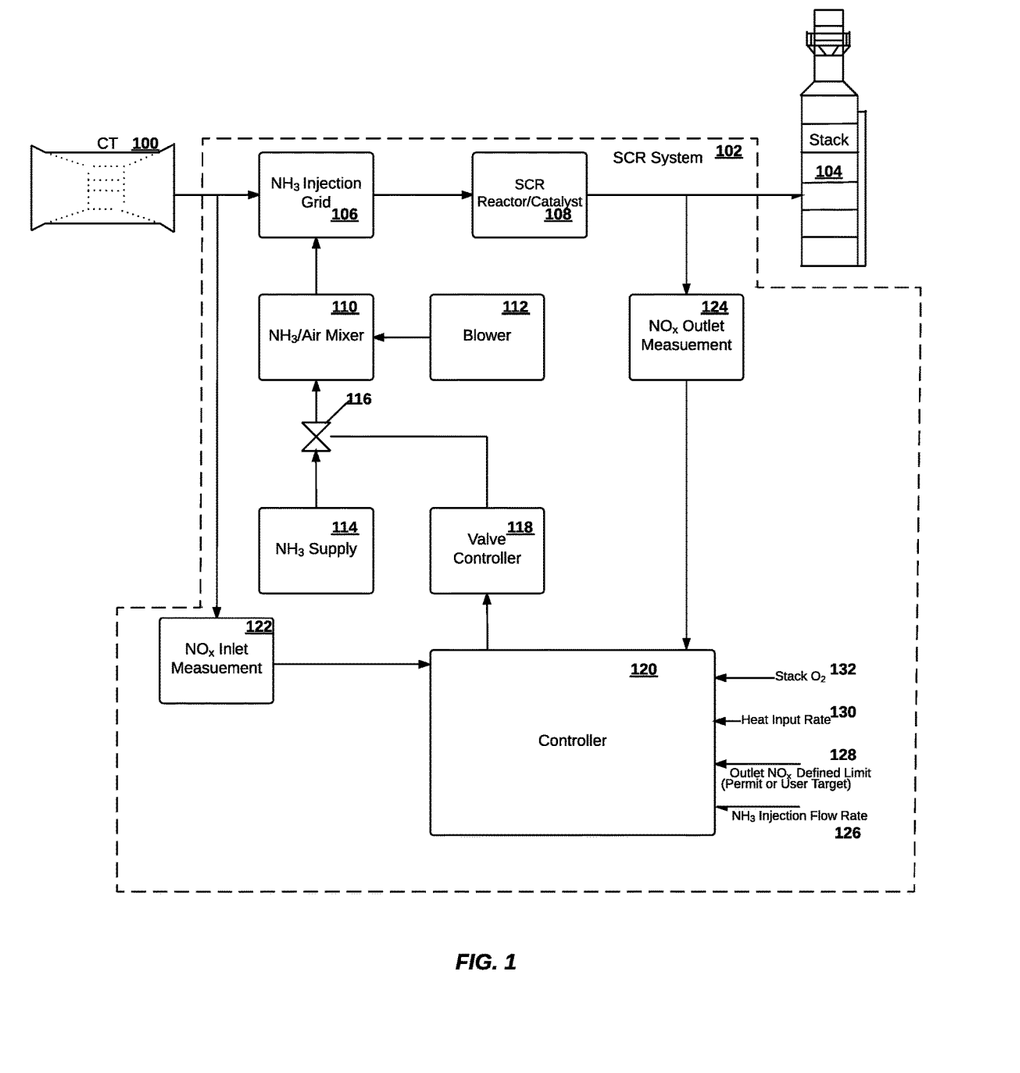
FIG. 1 is a high-level schematic showing an overview of an SCR system.

Referring to FIG. 1 there is depicted a high-level schematic showing an overview of an SCR system. A power generation system (i.e., combustion turbine (CT)) 100 generates dirty flue gas containing $NO_x$ emissions that enter a selective catalytic reduction (SCR) system 102. It will be understood by those skilled in the art that the flue gas may be treated by other air pollution control systems that are not shown, prior to entering SCR system 102 and/or after departing SCR system 102. The flue gas subsequent to treatment is exhausted to the ambient through stack 104. The flue gas from power generation system 100 is administered to an ammonia ($NH_3$) injection grid 106 and then passed to an SCR reactor containing a catalyst 108. The ammonia injection grid 106 receives a mixture of ammonia and air from ammonia/air mixer 110. The ammonia/air mixer 110 is connected to an air blower 112 and a supply of ammonia 114 that is metered by an ammonia control valve 116. A valve controller 118 adjusts the flow of ammonia through ammonia control valve 116. The valve controller 118 is coupled to a controller 120 that directs a process for optimizing ammonia injection in accordance with an aspect of the disclosure. The controller receives $NO_x$ measurements 122 of the inlet flue gas, and $NO_x$ measurements 124 of the outlet flue gas. The outlet $NO_x$ defined (compliance) limit 128, which may be a permit limit or some other user defined target, heat input rate 130, stack $O_2$ 132 and ammonia injection flow rate 126 are also received by controller 120.

Figure 2:
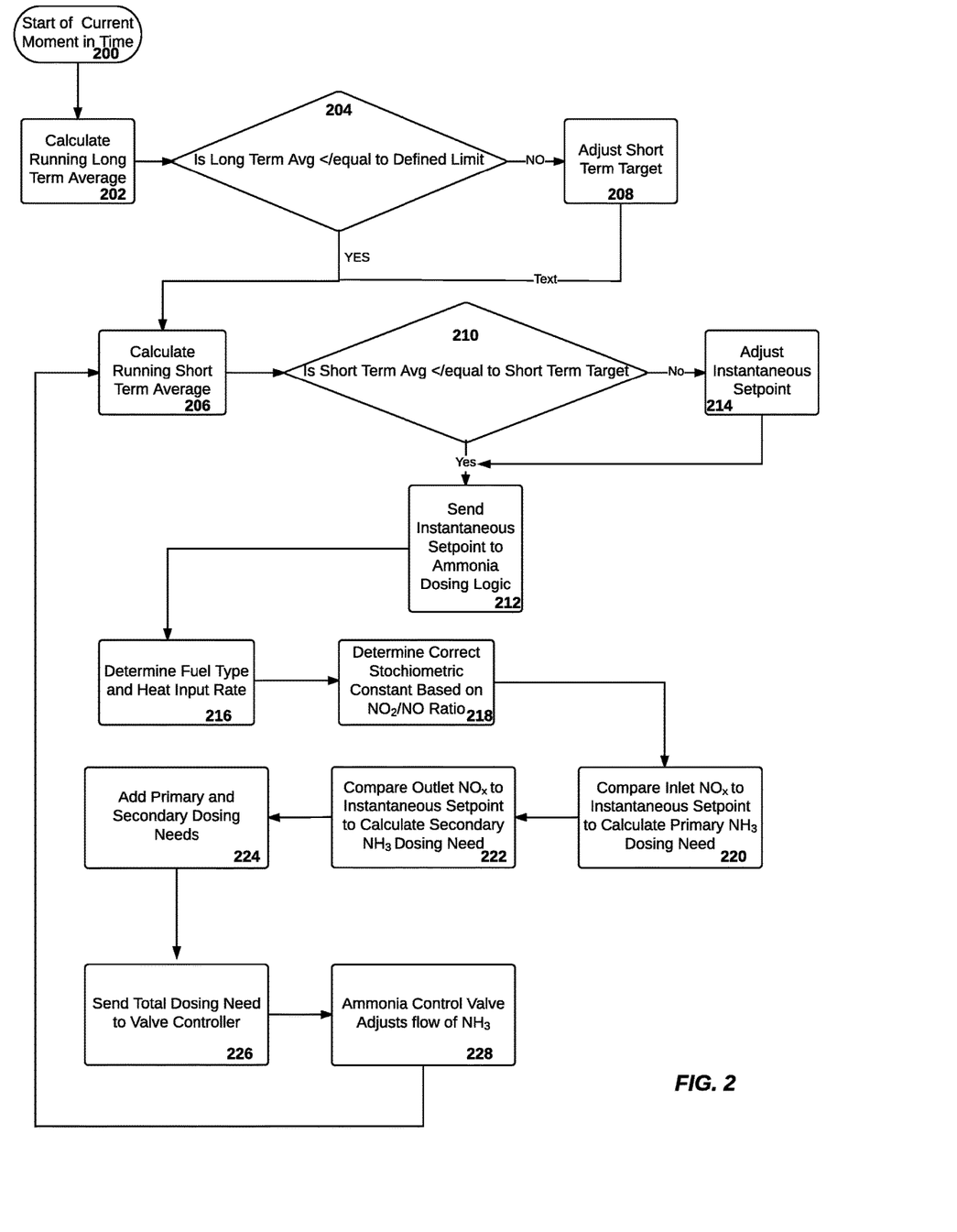
FIG. 2 is a flow diagram of a process in accordance with an aspect of the disclosure.

Referring now to FIG. 2, there is depicted a flow diagram of a process in accordance with an aspect of the disclosure. The process automates an outlet $NO_x$ setpoint based on running long term (i.e., daily) and short term (i.e., hourly) averages to ensure compliance with the defined compliance limit (permit or user defined). The long term average is the compliance target on the averaging time set for determining compliance in accordance with the permit or regulation. The compliance limit typically corresponds to a daily limit, but it could be set to a period less than daily (i.e., four hours). In either case, the short term average would still be set to one hour. In the case of a compliance limit that is set for a very short time (i.e., a one hour compliance limit), then the short term average can be set to a shorter duration (i.e., 15 or 20 minutes). The intent is to have each short term averaging block meet the standard such that the long term average will be in compliance. In this regard, a short term target is adjusted downwardly whenever the long term average falls behind the compliance target and might otherwise exceed the compliance limit if a temporary setpoint adjustment is not made. The ammonia dosing requirement in accordance with the disclosure is based on a chemical mass balance approach and the accuracy of the mass balance is enhanced by adjusting for the $NO_2$ to NO composition of $NO_x$. The process begins at block 200 representing current moment in time. At block 202, the running long term average of $NO_x$ is calculated based on $NO_x$ outlet measurements input to the controller since the start of the compliance period (i.e., day). This average is reset at the start of each compliance period. If the running long term average is greater than the defined limit at block 204, the short term target is adjusted at block 208. Otherwise, if the running long term average is less than or equal to the defined compliance limit at block 204, the short term target is set equal to the long term target (i.e., compliance limit) and the process jumps to block 206 where the running short term average of $NO_x$ for the current period (i.e., operating hour) is calculated. If the running short term average 206 is greater than the short term target at block 210, then the short term target is adjusted to set an adjusted instantaneous setpoint at block 214 prior to communication to the ammonia dosing logic at block 212. Otherwise, if the running hourly average 206 is less than or equal to the hourly target at block 210, the instantaneous setpoint is left set equal to the short term target and is communicated to ammonia dosing logic at block 212. At block 216, the ammonia dosing logic determines heat input rate by fuel type(s). At block 218 the ammonia dosing logic then determines a correct stoichiometric constant based on the $NO_2$ to NO composition of $NO_x$. This can be determined either through empirical relationships to load, or by real time measurement if available. The process proceeds to block 220 where the controller compares inlet $NO_x$ to the instantaneous setpoint and calculates a primary ammonia dosing need. At block 222, the controller compares outlet $NO_x$ to the instantaneous setpoint and calculates, using a proportional and integral (PI) controller, the secondary ammonia dosing need. The primary and secondary ammonia dosing needs are added at block 224 to provide a total ammonia dosing need that is that is communicated to a valve controller at block 226. The valve controller directs the ammonia control valve to adjust the flow of ammonia into the ammonia injection grid at block 228. In this manner, the controller keeps track of SCR outlet $NO_x$ emissions (compliance averages) and controls them to within the defined limit. If the running hourly average tracks high, the instantaneous setpoint is adjusted proportionally downward based upon an algorithm that takes into account the current running average compared to the instantaneous setpoint, and the time elapsed in the short term period from the start of the short term period in block 200 vs. the time remaining in the short term period to calculate a temporary adjustment to the instantaneous setpoint.

Figure 3:
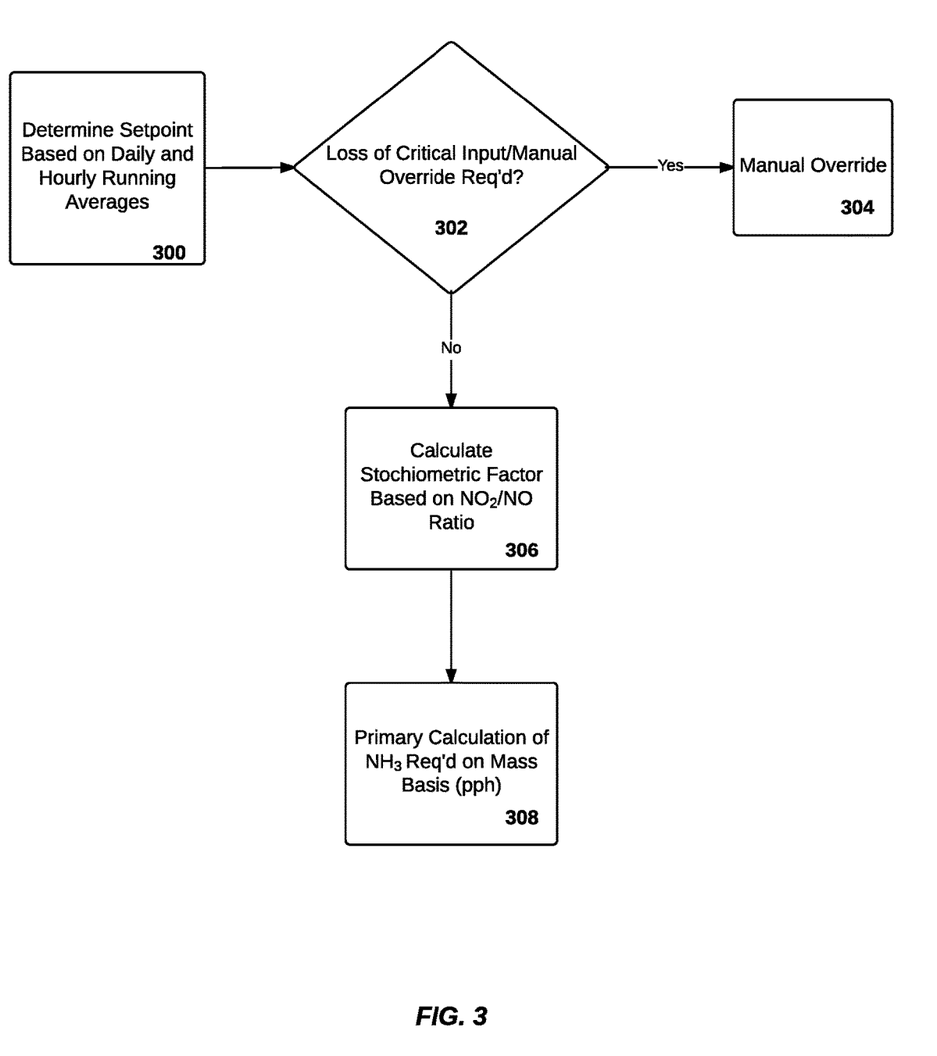
FIG. 3 is a flow diagram of exemplary ammonia dosing logic in accordance with an aspect of the disclosure.

Referring now to FIG. 3, there is depicted a flow diagram of exemplary ammonia dosing logic in accordance with an aspect of the disclosure. Block 300 represents determination of the instantaneous setpoint based on the running long term and short term averages. At block 302, if there is a loss of at least one of heat input, inlet $NO_x$, and outlet $NO_x$, the system may be manually overridden at block 304. At block 306, the stoichiometric constant is calculated based on the $NO_2$ to NO composition of $NO_x$.

Figure 4:
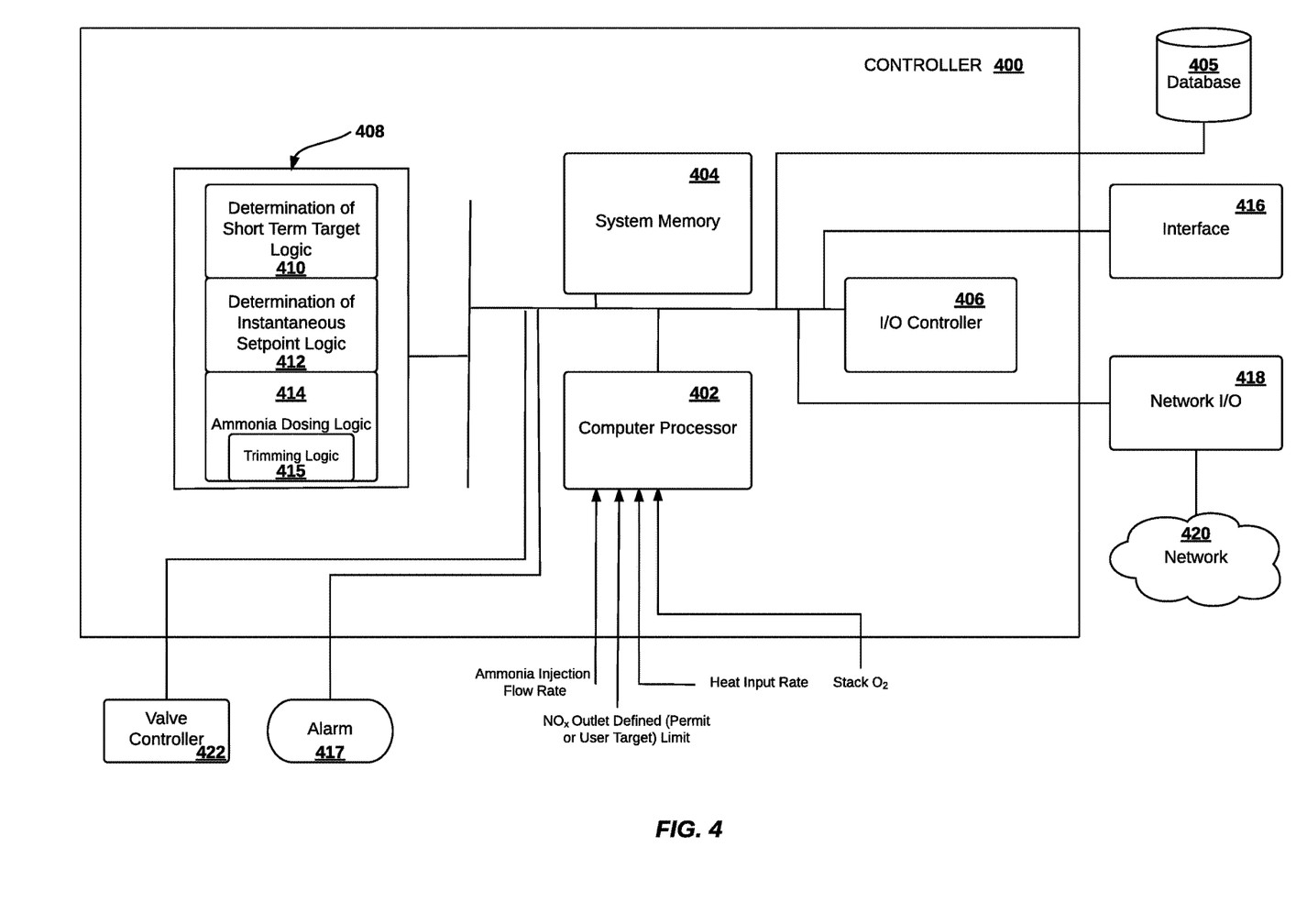
FIG. 4 is a schematic of an illustrative controller in accordance with an aspect of the disclosure.

FIG. 4 is a schematic of an illustrative controller 400 in accordance with an aspect of the disclosure. The controller 400 includes at least one processor 402 and system memory 404 including random access memory (RAM), read only memory (ROM), an I/O controller 406, and modules 408 that are either stored in memory 404 as machine readable instructions, or as separate programmable logic circuitry. The controller 400 may also be coupled to at least one external database 405. The modules 408 include determination of short term target logic 410, determination of instantaneous setpoint logic 412, and ammonia dosing logic 414. These modules are executed to perform the process steps set forth in FIGS. 2 and 3 as described in the foregoing. As previously described, the ammonia dosing logic adjusts the amount of ammonia to be dosed via the ammonia injection grid (106, FIG. 1) based upon the combined primary and secondary dosing needs dependent upon the instantaneous setpoint and determined stoichiometric constant based upon the ratio of $NO_2$ to NO. The ammonia dosing logic may include trimming logic 415 for fine-tuning the ammonia flow based on a compliance $NO_x$ measurement. The controller 400 is coupled to a control interface 416 that enables an operator to manually control the system and override the process in the event of a loss of at least one of heat input rate, inlet $NO_x$ and outlet $NO_x$ as described above. In such a case the SCR manually operated based on known load based ammonia curves. Likewise, if a major process upset results in usually elevated hourly/daily $NO_x$, an operator can manually control and override the setpoint to counter such upsets. An alarm 417 can be triggered upon loss of these critical inputs and/or a major process upset. The control interface 416 may be of the type currently known to those skilled in the art. Further, controller 400 may be coupled to a network interface 418 for communicating over a data network 420. The network interface 418 can include a plurality of communications channels for simultaneous communication with other processors, servers, etc., in accordance with general networking principles. The controller 400 determines the proper ammonia dosing requirement as set forth above and communicates with valve controller 422 to control the amount flow to the ammonia injection grid.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method of dosing ammonia in a selective catalytic reduction (SCR) system for reducing $NO_x$ emissions in a flue gas, the method comprising:

calculating a running long term average, starting from the beginning of a compliance period, of $NO_x$ emissions;

determining whether the running long term average is greater than a defined $NO_x$ emissions limit for the compliance period and adjusting a short term target based on the running long term average being greater than the defined limit;

calculating a running short term average, starting from the beginning of a short-term period that is shorter than the compliance period, of the $NO_x$ emissions;

adjusting an instantaneous $NO_x$ setpoint based on the running short term average being greater than the adjusted short term target;

determining a stoichiometric constant based upon continuous real-time measurements of a ratio of $NO_2$ to NO in the $NO_x$ emissions;

comparing inlet $NO_x$ to the instantaneous setpoint and calculating a primary ammonia dosing need, the inlet $NO_x$ being measured at a location in the SCR system upstream of administering ammonia into the flue gas;

comparing outlet $NO_x$ to the instantaneous setpoint and calculating a secondary ammonia dosing need, the outlet $NO_x$ being measured at a location in the SCR system downstream of an SCR reactor or catalyst;

controlling an ammonia dosing valve to administer ammonia into the flue gas, the dosing valve being at a location in the SCR system upstream of the SCR reactor or catalyst, based upon the combined primary and secondary ammonia dosing need and based upon the determined stoichiometric constants in a short-term control loop, continuously sequentially repeating the calculating the running short term average, the adjusting the instantaneous $NO_x$ setpoint, the determining the stoichiometric constant, the comparing inlet $NO_x$ to the instantaneous setpoint, the calculating the primary ammonia dosing need, the comparing outlet $NO_x$ to the instantaneous setpoint, the calculating the secondary ammonia dosing need, and the controlling the ammonia dosing valve, for the duration of the short term period; and at the end of the short-term period and the start of a new short term period, in a compliance period control loop, recalculating the running long term average, re-adjusting the short term target or resetting the short term target to be equal to the defined limit, and continuously repeating the short-term control loop for the duration of the new short-term period.

2. The method according to claim 1, wherein the long term duration corresponds to a duration of one day and the short term duration corresponds to a duration of one hour.

3. The method according to claim 1, further comprising temporarily adjusting the instantaneous setpoint based upon a comparison of the running short term average to the instantaneous setpoint, a first time elapsed in a short term period, and a second time remaining in the short term period.

4. The method according to claim 1, further comprising determining a fuel type and heat input rate, and upon detecting a loss of at least one of heat input, inlet NO and outlet NON, manually overriding the administration of ammonia into the flue gas.

5. The method according to claim 4, wherein the manually overriding comprises manually controlling the instantaneous setpoint.

6. The method according to claim 1, further comprising repeating the compliance period control loop for the duration of the compliance period.

7. A controller for dosing ammonia in a selective catalytic reduction (SCR) system for reducing $NO_x$ emissions in a flue gas, the controller comprising:
  a processor;
  memory storing machine readable instructions, which when executed by the processor, cause the processor to:
  calculate a running long term average, starting from the beginning of a compliance period, of $NO_x$ emissions;
  determine whether the running long term average is greater than a defined $NO_x$ emissions limit for the compliance period and adjust a short term target based on the running long term average being greater than the defined limit;
  calculate a running short term average, starting from the beginning of a short-term period that is shorter than the compliance period, of the $NO_x$ emissions;
  adjust an instantaneous $NO_x$ setpoint target based on the running short term average being greater than the adjusted short term target;
  determine a stoichiometric constant based upon continuous real time measurements of a ratio of $NO_2$ to NO in the $NO_x$ emissions;
  compare inlet $NO_x$ to the instantaneous setpoint and calculate a primary ammonia dosing need, the inlet $NO_x$ being measured at a location in the SCR system upstream of administering ammonia into the flue gas;
  compare outlet $NO_x$ to the instantaneous setpoint and calculate a secondary ammonia dosing need, the outlet $NO_x$ being measured at a location in the SCR system downstream of an SCR reactor or catalyst;
  control an ammonia dosing valve to administer ammonia into the flue gas, the dosing valve being at a location in the SCR system upstream of the SCR reactor or catalyst, based upon the combined primary and secondary ammonia dosing need and based upon the determined stoichiometric constant;
  in a short-term control loop, continuously sequentially repeat the calculation of the running short term average, the adjustment of the instantaneous $NO_x$ setpoint, the determination of the stoichiometric constant, the comparison of inlet $NO_x$ to the instantaneous setpoint, the calculation of the primary ammonia dosing need, the comparison of outlet $NO_x$ to the instantaneous setpoint, the calculation of the secondary ammonia dosing need, and the control of the ammonia dosing valve, for the duration of the short term period; and
  at the end of the short-term period and the start of a new short-term period, in a compliance period control loop, recalculate the running long term average, re-adjust the short term target or reset the short term target to be equal to the defined limit, and continuously repeat the short-term control loop for the duration of the new short-term period.

8. The controller according to claim 7, wherein the long term duration corresponds to a duration of one day and the short term duration corresponds to a duration of one hour.

9. The controller of claim 7, wherein the processor is configured to temporarily adjust the instantaneous setpoint based upon a comparison of the running short term average to the instantaneous setpoint, a first time elapsed in a short term period, and a second time remaining in the short term period.

10. The controller of claim 7, wherein the processor is configured to determine a fuel type and heat input rate, and is configured to, upon detecting loss of at least one of heat input, inlet NO and outlet $NO_x$, enable manually overriding administration of ammonia into the flue gas.

11. The controller of claim 10, wherein manually overriding comprises manually controlling the instantaneous setpoint.

12. The controller according to claim 7, wherein the instructions when executed by the processor further cause the processor to repeat the compliance period control loop for the duration of the compliance period.

13. A non-transitory computer readable storage medium comprising machine readable instructions stored thereon, which when executed by a processor, causes a controller in a selective catalytic reduction (SCR) system for reducing $NO_x$ emissions in a flue gas to:
  calculate a running long term average, starting from the beginning of a compliance period, of $NO_x$ emissions;
  determine whether the running long term average is greater than a defined $NO_x$ emissions limit for the compliance period and adjust a short term target based on the running long term average being greater than the defined limit;
  calculate a running short term average, starting from the beginning of a short-term period that is shorter than the compliance period, of the $NO_x$ emissions;
  adjust an instantaneous $NO_x$ setpoint target based on the running short term average being greater than the adjusted short term target;
  determine a stoichiometric constant based on continuous real-time measurements of a ratio of $NO_2$ to NO in the $NO_x$ emissions;
  compare inlet $NO_x$ to the instantaneous setpoint and calculate a primary ammonia dosing need, the inlet $NO_x$ being measured at a location in the SCR system upstream of administering ammonia into the flue gas;
  compare outlet $NO_x$ to the instantaneous setpoint and calculate a secondary ammonia dosing need, the outlet $NO_x$ being measured at a location in the SCR system downstream of an SCR reactor or catalyst;
  control an ammonia dosing valve to administer ammonia into the flue gas, the dosing valve being at a location in the SCR system upstream of the SCR reactor or catalyst, based upon the combined primary and secondary ammonia dosing need and based upon the determined stoichiometric constant;
  in a short-term control loop, continuously sequentially repeat the calculation of the running short term average, the adjustment of the instantaneous $NO_x$ setpoint, the determination of the stoichiometric constant, the comparison of inlet $NO_x$ to the instantaneous setpoint, the calculation of the primary ammonia dosing need, the comparison of outlet $NO_x$ to the instantaneous setpoint, the calculation of the secondary ammonia dosing need, and the control of the ammonia dosing valve, for the duration of the short term period; and at the end of the short-term period and the start of a new short-term period, in a compliance period control loop, recalculate the running long term average, re-adjust the short term target or reset the short term target to be equal to the defined limit, and continuously repeat the short-term control loop for the duration of the new short-term period.

14. The non-transitory memory medium according to claim 13, wherein the long term duration corresponds to a duration of one day and the short term duration corresponds to a duration of one hour.

15. The non-transitory memory medium according to claim 13, which when executed further causes the controller to temporarily adjust the instantaneous setpoint based upon a comparison of the running short term average to the instantaneous setpoint, a first time elapsed in a short term period, and a second time remaining in the short term period.

16. The non-transitory memory medium according to claim 13, which when executed further causes the controller to determine a fuel type and heat input rate, and upon detecting loss of at least one of heat input, inlet $NO_x$, and outlet $NO_x$, to enable manual override of administration of ammonia into the flue gas.

17. The non-transitory memory medium according to claim 13, wherein the instructions when executed by the processor further cause the controller to repeat the compliance period control loop for the duration of the compliance period.

* * * * *

UNITED STATES PATENT AND TRADEMARK OFFICE
CERTIFICATE OF CORRECTION

PATENT NO. : 10,391,448 B2
APPLICATION NO. : 15/163854
DATED : August 27, 2019
INVENTOR(S) : Matthew Gerard Boze It is certified that error appears in the above-identified patent and that said Letters Patent is hereby corrected as shown below:

In the Claims

Column 9, Lines 11-12, Claim 4 reads:
"inlet NO and outlet NON, manually"
Should read:
-- inlet $NO_x$ and outlet $NO_x$, manually --

Column 10, Line 18, Claim 10 reads:
"input, inlet NO and outlet $NO_x$, enable"
Should read:
-- input, inlet $NO_x$ and outlet $NO_x$, enable --

Signed and Sealed this
Twenty-ninth Day of October, 2019

Andrei Iancu
*Director of the United States Patent and Trademark Office*